United States Patent
Byun

(10) Patent No.: US 9,927,994 B2
(45) Date of Patent: Mar. 27, 2018

(54) MEMORY SYSTEM AND OPERATING METHOD THEREOF

(71) Applicant: SK hynix Inc., Gyeonggi-do (KR)

(72) Inventor: Eu-Joon Byun, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/434,319

(22) Filed: Feb. 16, 2017

(65) Prior Publication Data

US 2018/0004440 A1 Jan. 4, 2018

(30) Foreign Application Priority Data

Jun. 30, 2016 (KR) .................... 10-2016-0082771

(51) Int. Cl.
| | |
|---|---|
| *G11C 16/04* | (2006.01) |
| *G06F 3/06* | (2006.01) |
| *G06F 12/0808* | (2016.01) |
| *G06F 1/32* | (2006.01) |
| *G06F 12/128* | (2016.01) |

(52) U.S. Cl.
CPC .......... *G06F 3/0619* (2013.01); *G06F 1/3287* (2013.01); *G06F 3/065* (2013.01); *G06F 3/068* (2013.01); *G06F 3/0659* (2013.01); *G06F 12/0808* (2013.01); *G06F 12/128* (2013.01)

(58) Field of Classification Search
CPC ........ G06F 3/0619; G06F 3/065; G06F 3/068; G06F 3/0659
See application file for complete search history.

(56) References Cited

U.S. PATENT DOCUMENTS

| 8,966,203 B2 | 2/2015 | Taillefer |
| 9,298,650 B2* | 3/2016 | Cho .................... G06F 13/1668 |
| 9,373,182 B2 | 6/2016 | Rao et al. |
| 9,460,796 B2* | 10/2016 | Jang .................... G11C 11/5628 |
| 9,471,418 B2* | 10/2016 | Ahn .................... G06F 11/1048 |
| 2014/0280396 A1 | 9/2014 | Oh et al. |
| 2016/0041759 A1 | 2/2016 | Han |
| 2017/0139627 A1* | 5/2017 | Lee .................... G06F 3/0626 |

FOREIGN PATENT DOCUMENTS

| KR | 1020150018682 | 2/2015 |
| WO | WO 2008/022434 | 2/2008 |

* cited by examiner

*Primary Examiner* — Pho M Luu

(74) *Attorney, Agent, or Firm* — IP & T Group LLP

(57) ABSTRACT

A memory system may include: a memory device comprising a plurality of pages, which include a plurality of memory cells coupled to a plurality of word lines, and in which data is stored, a plurality of memory blocks in which the pages are included, a plurality of planes including the memory blocks, and a plurality of memory dies in which the planes are included; and a controller including a first memory, the controller configured to perform a command operation to store data segments of user data for the command operation in the memory blocks, and store meta segments of metadata for the command operation in the memory blocks and a second memory included in the host.

18 Claims, 8 Drawing Sheets

MEMORY SYSTEM AND OPERATING METHOD THEREOF

CROSS-REFERENCE TO RELATED APPLICATION

This U.S. non-provisional patent application claims priority under 35 U.S.C. § 119(a) to Korean Patent Application No, 10-2016-0082771 filed on Jun. 30, 2016 in the Korean Intellectual Property Office (KIPO), the disclosure of which is incorporated herein by reference in its entirety.

TECHNICAL FIELD

Embodiments of the present invention relate to a semiconductor memory system for processing data to and from a memory device, and an operating method thereof.

DISCUSSION OF THE RELATED ART

The computer environment paradigm has shifted to ubiquitous computing systems that can be used anytime and anywhere. Due to this, use of portable electronic devices such as mobile phones, digital cameras, and notebook computers has rapidly increased. These portable electronic devices generally use a memory system having one or more memory devices for storing data. The memory system may be used as a main memory device or an auxiliary memory device of a portable electronic device.

Memory systems using me or r devices provide excellent stability, durability, high information access speed, and low power consumption, since they have no moving parts. Examples of memory systems having such advantages include universal serial bus (USB) memory devices, memory cards having various interfaces, and solid state drives (SSD).

SUMMARY

Various embodiments are directed to a memory system capable of minimizing complexity and performance deterioration thereof, and maximizing efficiency in use of a memory device, thus making it possible to rapidly and reliably process data with respect to the memory device, and an operating method thereof.

In an embodiment of the present invention, a memory system may include: a memory device comprising a plurality of pages, which include a plurality of memory cells coupled to a plurality of word lines, and in which data is stored, a plurality of memory blocks in which the pages are included, a plurality of planes including the memory blocks, and a plurality of memory dies in which the planes are included; and a controller including a first memory, the controller configured to perform a command operation to store data segments of user data for the command operation in the memory blocks, and store meta segments of metadata for the command operation in the memory blocks and a second memory included in the host.

The controller may store the meta segments of metadata for the command operation in the memory blocks and in a Unified Memory (UM) region of the second memory through a double flush operation.

The controller may load meta segments stored in the UM region of the second memory, on the first memory and performs an update operation for the metadata.

In the case where power off occurs in the host and the memory system after the double flush operation has been performed, the controller may load, when the memory system is changed to a power-on state, meta segments from the memory blocks on the first memory and performs an update operation for the metadata.

The controller may store, through a program operation of the command operation, the data segments in pages that are included in a first, memory block and a second memory block among the memory blocks.

The controller may store, in correspondence to a size of the program operation, the meta segments in the pages of the first memory block and the second memory block and in the UM region of the second memory, respectively.

The controller may store, in correspondence to the size of the program operation, each of the meta segments on a page basis, a multi-plane basis, a multi-memory die basis, or a multi-channel basis.

The first memory block may be an arbitrary memory block among memory blocks included in art plane of a first memory die among the memory dies.

The second memory block may be at least one of another arbitrary memory block different from the arbitrary memory block among the memory blocks included in the first plane of the first memory die among the memory dies, and an arbitrary memory block among memory blocks included in a second plane of the first memory die.

The second memory block may be an arbitrary memory block among memory blocks included in a plurality of planes of a second memory die among the memory dies.

In an embodiment of the present invention, an operating method of a memory system may include: receiving a command from a host, for a plurality of pages, which are included in each of a plurality of memory blocks of a memory device, and which include a plurality of memory cells coupled to a plurality of word lines; performing a command operation corresponding to the command, between a controller of the memory device and the memory blocks included in a plurality of planes in a plurality of memory dies included in the memory device; and storing data segments of user data for the command operation in the memory blocks, and storing meta segments of metadata for the command operation in the memory blocks and a second memory included in the host.

The storing meta segments may include storing the meta segments for the command operation in the memory blocks and in an Unified Memory (UM) region of the second memory through a double flush operation.

The operating method may further include: loading the meta segments stored in the UM region of the second memory, on a first memory included in the controller of the memory device, and performing an update operation for the metadata.

The operating method may further include: loading, when the memory system is changed to a power-on state after power off has occurred in the host and the memory system after the double flush operation has been performed, meta segments from the memory blocks on the first memory, and performing an update operation for the metadata.

The storing data segments may include storing, through a program operation of the command operation, the data segments in pages that are included in a first memory block and a second memory block among the memory blocks.

The storing meta segments may include storing, in correspondence to a size of the program operation, the meta segments in the pages of the first memory block and the second memory block and in the UM region of the second memory, respectively.

The storing meta segments may include storing, in correspondence to the size of the program operation, each of the meta segments on a page basis, a multi-plane basis, a multi-memory die basis, or a multi-channel basis.

The first memory block may be an arbitrary memory block among memory blocks included in a first plane of a first memory die among the memory dies.

The second memory block may be at least one of another arbitrary memory block different from the arbitrary memory block among the memory blocks included in the first plane of the first memory die among the memory dies, and an arbitrary memory block among memory blocks included in a second plane of the first memory die.

The second memory block may be an arbitrary memory block among memory blocks included in a plurality of planes of a second memory die among the memory dies.

BRIEF DESCRIPTION OF THE DRAWINGS

These and other features and advantages of the present invention will become apparent to persons skilled in the art to which this invention pertains from the following detailed description of various embodiments of the present invention in reference to the accompanying drawings, wherein.

DETAILED DESCRIPTION

Figure 1:
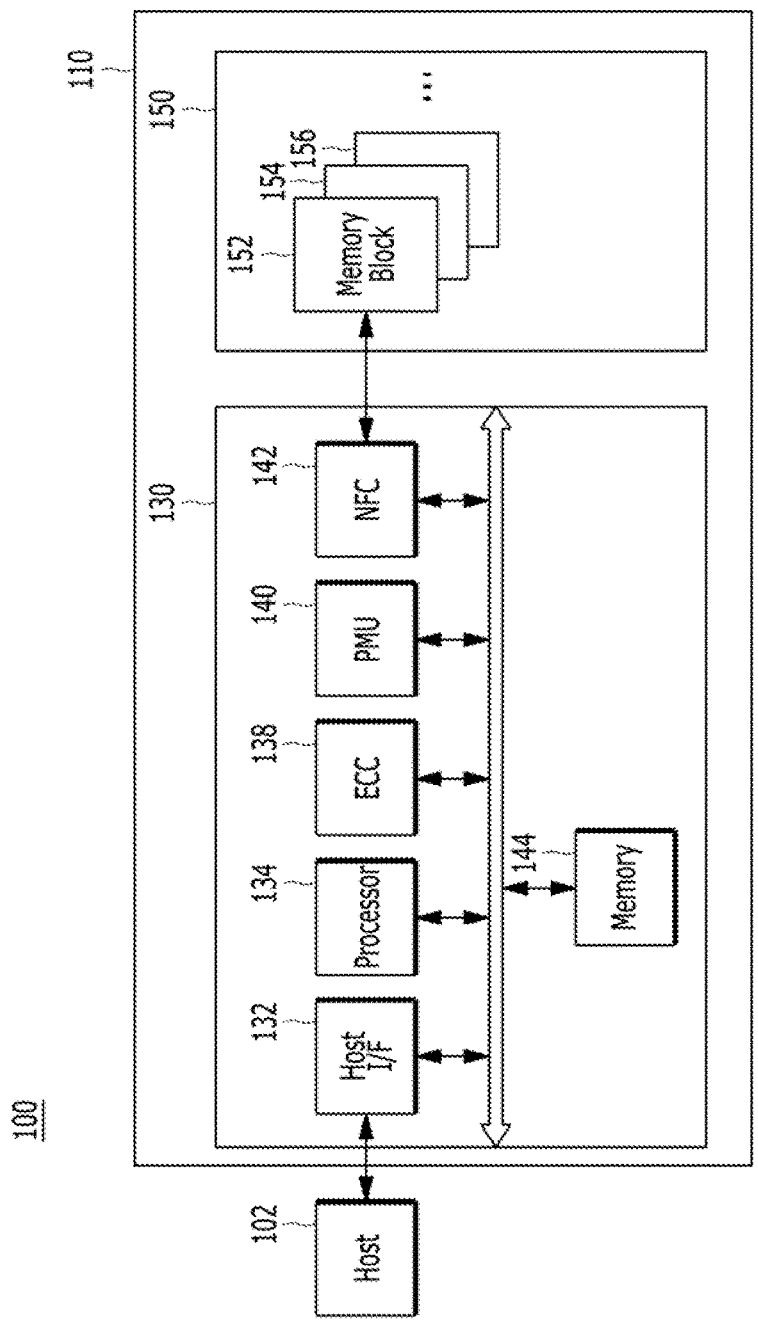
FIG. 1 is a diagram illustrating a data processing system including a memory system coupled to a host, according to an embodiment of the present invention.

Although various embodiments are described below in more detail with reference to the accompanying drawings, we note that the present invention may, however, be embodied in different forms and should not be construed as being limited only to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

It will be understood that, although the terms "first", "second", "third" and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention.

As used herein, singular forms are intended to include the plural forms as well, unless the context clearly indicates otherwise.

It will be further understood that the terms "comprises," "comprising," includes and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and not be interpreted in an idealized or overly formal sense unless expressly so defined herein.

We further note that in the following description, numerous specific details are set forth in for providing a thorough understanding of the present invention. However, as would be apparent to those skilled in the relevant art, the present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Hereinafter, the various embodiments of the present invention will be described with reference to the attached drawings.

FIG. 1 illustrates a data processing system 100 including a memory system 110, according to an embodiment of the present invention.

Referring to FIG. 1, a data processing system 100 may include a host 102 operatively coupled to a memory system 110.

The host 102 may include, for example, a portable electronic device such as a mobile phone, an MP3 player and a laptop computer or a non-portable electronic device such as a desktop computer, a game player, a TV and a projector.

The memory system 110 may operate in response to a request received from the host 102. For example, the memory system 110 may store data to be accessed by the host 102. The memory system 110 may be used as a main memory system or an auxiliary memory system of the host 102. The memory system 110 may be implemented with any one of various storage devices, according to the protocol of a host interface to be coupled electrically with the host 102. The memory system 110 may be implemented with any one of various storage devices, such as, for example, a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, such as, a dynamic random access memory (DRAM) and a static random access memory (SRAM) or a nonvolatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase-change RAM (PRAM), a magnetoresistive RAM (MRAM), a resistive RAM (RRAM), and a flash memory.

The memory system 110 may include a memory device 150 for storing data to be accessed by the host 102, and a controller 130 operatively coupled to the memory device 150 for controlling the storage of data in the memory device 150 and the transfer of stored data from the memory device to the host.

The controller 130 and the memory device 150 may be integrated into a single semiconductor device. For instance, the controller 130 and the memory device 150 may be integrated into a single semiconductor device configured as a solid state drive (SSD). When the memory system 110 is used as the SSD, the operation speed of the host 102 that is electrically coupled with the memory system 110 may be significantly increased.

The controller 130 and the memory device 150 may be integrated into a single semiconductor device configured as a memory card, such as, for example, a Personal Computer Memory Card International Association (PCMCIA) card, a compact flash (CF) card, a smart media card (SMC), a memory stick, a multimedia card (MMC), an RS-MMC, a micro-MMC, a secure digital (SD) card a mini-SD, a micro-SD, an SDHC, and a universal flash storage (UFS) device.

For another instance, the memory system 110 may be configured as part of a computer, an ultra-mobile PC (UMPC), a workstation, a net-book, a personal digital assistant (PDA), a portable computer, a web tablet, a tablet computer, a wireless phone, a mobile phone, a smart phone, an, e-book a portable multimedia player (PMP), a portable game player, a navigation device, a black box, a digital camera a digital multimedia broadcasting (DMB) player, a three-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, an RFID device, or one of various component elements configuring a computing system.

The memory device 150 of the memory system 110 may retain stored data when power supply to the device is interrupted and, in particular, store the data provided from the host 102 during a write operation, and provide stored data to the host 102 during a read operation. The memory device 150 may include a plurality of memory blocks, for example, memory blocks 152, 154 and 156. Each of the memory blocks 152, 154 and 156 may include a plurality of pages. Each of the pages may include a plurality of memory cells coupled to a word line (WL). The memory device 150 may be a nonvolatile memory device, for example, a flash memory. The flash memory may have a three-dimensional (3D) stack structure. The structure of the memory device 150 and the three-dimensional 3D) stack structure of the memory device 150 will be described later.

The controller 130 of the memory system 110 may control the memory device 150 in response to a request from the host 102. For example, upon receiving a read request from the host 102 the controller 130 may issue a read command and an address to the memory device for reading the data which are stored in the requested address in the memory device and may provide the data read from the memory device 150, to the host 102. Also, in response to a program request (also referred to as a write request) received from the host 102, the controller 130 may issue a write command, an address and write data and may control the operation of the memory device for storing the write data into the memory device 150. The write data are provided from the host 102 to the memory controller together with the write request. To this end the controller 130 may control one or more operations of the memory device 150 including, for example, a read operation, a write operation and an erase operation. The controller 130 may also control one or more background operations of the memory device 150.

In the illustrated embodiment of FIG. 1, the controller 130 includes a host interface unit 132, a processor 134, an error correction code (ECC) unit 138, a power management unit (PMU) 140, a NAND flash controller (NFC) 142, and a memory 144.

The host interface unit 132 provides an interface between the host and the controller 130. For example, the host interface 132 may receive and process requests, addresses and data provided from the host 102. The host interface may also transmit read data from the memory device to the host. The host interface 132 may communicate with the host 102 through at least one of various well-known interface protocols such as a universal serial bus (USB), a multimedia card (MMC) a peripheral component interconnect-express (PCI-E), a serial attached SCSI (SAS), a serial advanced technology attachment (SATA), a parallel advanced technology attachment (PATA), small computer system interface (SCSI), enhanced small disk interface (ESDI), and integrated drive electronics (IDE).

The ECC unit 138 may detect and correct errors in the data read from the memory device 150 during the read operation. The ECC unit 138 may not correct error bits when the number of the error bits is greater than or equal to a threshold number of correctable error bits, and may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all circuits, systems or devices for the error correction operation.

The PMU 140 may provide and manage power for the controller 130, that is, power for the component elements included in the controller 130.

The NFC 142 may serve as a memory interface between the controller 130 and the memory device 150 to allow the controller 130 to control the memory device 150 in response to a request from the host 102. The NFC 142 may generate control signals for the memory device 150 and process data under the control of the processor 134 when the memory device 150 includes a flash memory and, in particular, when the memory device 150 includes a NAND flash memory.

The memory 144 may serve as a working memory of the memory system 110 and the controller 130, and store data for driving the memory system 110 and the controller 130. The controller 130 may control the memory device 150 in response to a request from the host 102. For example, the controller 130 may provide the data read from the memory device 150 to the host 102 and store the data provided from the host 102 in the memory device 150. When the controller 130 controls the operations of the memory device 150, the memory 144 may store data used by the controller 130 and the memory device 150 for such operations as read operation, write operation, program operation and erase operation.

The memory 144 may be implemented with volatile memory. The memory 144 may be implemented with a static random access memory (SRAM) or a dynamic random access memory (DRAM). As described above, the memory 144 may store data used by the host 102 and the memory device 150 for the read and write operations. To store the data the memory 144 may include a program memory, a data memory, a write buffer, a read buffer, a map buffer, and so forth.

The processor 134 may control general operations of the memory system 110, and a write operation or a read operation for the memory device 150, in response to a write request or a read request from the host 102. The processor 134 may drive firmware, which is referred to as a flash translation layer (FTL), to control the general operations of the memory system 110. The processor 134 may be implemented with a microprocessor or a central processing unit (CPU).

A management unit (not shown) may be included in the processor 134, and may perform bad block management of the memory device 150. The management unit may find bad memory blocks included in the memory device 150, which are in unsatisfactory condition for further use, and perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. Also, the bad blocks due to the program fail seriously deteriorates the utilization efficiency of the memory device 150 having a 3D stack structure and the reliability of the memory system 100, and thus reliable bad block management is required.

Figure 2:
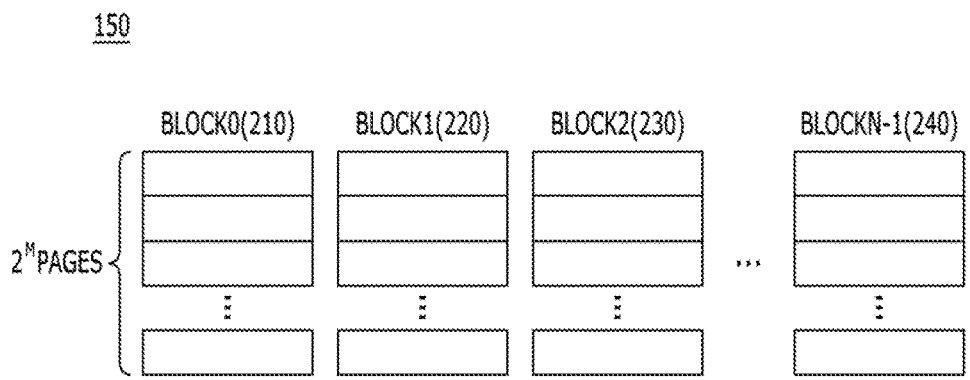
FIG. 2 is a diagram illustrating a memory device employed in the memory system of FIG. 1, according to an embodiment of the present invention.

FIG. 2 is a schematic diagram illustrating the memory device 150 of FIG. 1.

Referring to FIG. 2, the memory device 150 may include a plurality of memory blocks, for example, zeroth to (N−1)$^{th}$ blocks 210 to 240. Each of the plurality of memory blocks 210 to 240 may include a plurality of pages, for example, $2^M$ number of pages ($2^M$ PAGES), to which the present invention will not be limited. Each of the plurality of pages may include a plurality of memory cells to which a plurality of word lines are electrically coupled.

Also, the memory device 150 may include a plurality of memory blocks, as single level cell (SLC) memory blocks and multi-level cell (MLC) memory blocks, according to the number of bits which may be stored or expressed in each memory cell. The SLC memory block may include a plurality of pages which are implemented with memory cells each capable of storing 1-bit data. The MLC memory block may include a plurality of pages which are implemented with memory cells each capable of storing multi-bit data, for example, two or more-bit data. The MLC memory block including a plurality of pages which are implemented with memory cells that are each capable of storing 3-bit data may be defined as a triple level cell (TLC) memory block.

Each of the plurality of memory blocks 210 to 240 may store the data provided from the host device 102 during a write operation, and may provide stored data to the host 102 during a read operation.

Figure 3:
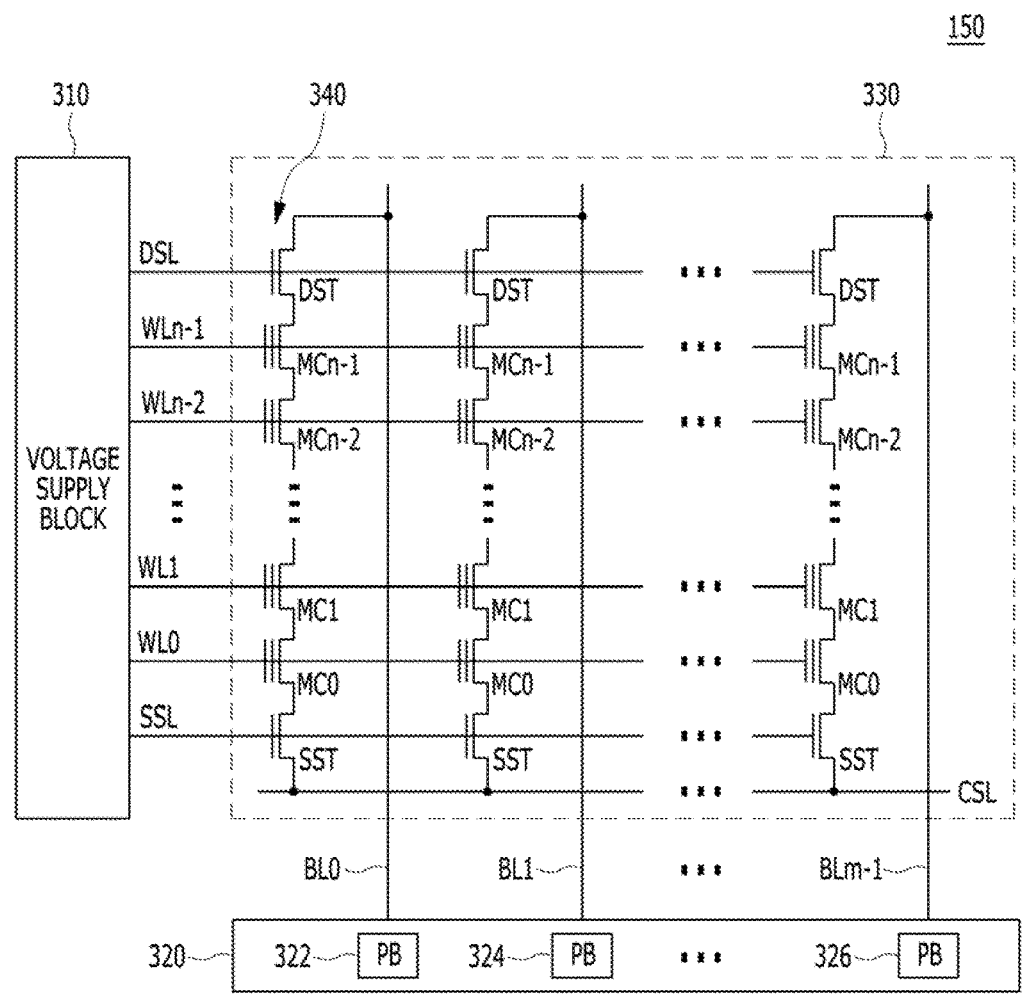
FIG. 3 is a diagram schematically illustrating a memory cell array circuit of a memory block in a memory device, according to an embodiment of the present invention.

FIG. 3 is a circuit diagram illustrating an example of a memory block in a memory device.

Referring to FIG. 3, a memory block 330 of a memory device 300 may include a plurality of cell strings 340 which are realized into a memory cell array and are coupled to bit lines BL0 to BLm−1, respectively. The cell string 340 of each column may include at least one drain select transistor DST and at least one source select transistor SST. A plurality of memory cells or memory cell transistors MC0 to MCn−1 may be coupled in series between the select transistors DST and SST. The respective memory cells MC0 to MCn−1 may be constructed by mufti-level cells (MLC) each of which stores a data information of a plurality of bits. The cell strings 340 may be electrically coupled to corresponding bit lines BL0 to BLm−1, respectively. For reference, in FIG. 3 'DSL' may denote a drain select line, 'SSL' may denote a source select line, and 'CSL' may denote a common source line.

While FIG. 3 shows, as an example, the memory block 330 which is constructed by NAND flash memory cells, it is to be noted that the memory block 330 of the memory device 300 according to the embodiment is not limited to a NAND flash memory and may be realized by a NOR flash memory, a hybrid flash memory in which at least two kinds of memory cells are combined or a one-NAND flash memory in which a controller is built in a memory chip. The operational characteristics of a semiconductor device may be applied to not only a flash memory device in which a charge storing layer is constructed by conductive floating gates but also a charge trap flash (CTF) in which a charge storing layer is constructed by a dielectric layer.

A voltage supply block 310 of the memory device 300 may provide word line voltages (for example, a program voltage, a read voltage and a pass voltage) to be supplied to respective word lines according to an operation mode and voltages to be supplied to bulks (for example, well regions) formed with memory cells. The voltage generating operation of the voltage supply block 310 may be performed by the control of a control circuit (not shown). The voltage supply block 310 may generate a plurality of variable read voltages to generate a plurality of read data, select one of the memory blocks (or sectors) of a memory cell array in response to the control of the control circuit select one of the word lines of the selected memory block, and provide the word line voltages to the selected word line and unselected word lines.

A read/write circuit 320 of the memory device 300 is controlled by the control circuit, and may operate as a sense amplifier or a write driver according to an operation mode. For example, in the case of a verify/normal read operation, the read write circuit 320 may operate as a sense amplifier for reading data from the memory cell array. Also, in the case of a program operation, the read/write circuit 320 may operate as a write driver which drives bit lines according to data to be stored in the memory cell array. In the program operation, the read/write circuit 320 may receive data to be written in the memory cell array, from a buffer (not shown), and may drive the bit lines according to inputted data. To this end, the read/write circuit 320 may include a plurality of page buffers (PB) 322, 324 and 326 respectively corresponding to columns (or bit lines) or pairs of columns (or pairs of bit lines), and a plurality of latches (not shown) may be included in each of the page buffers 322, 324 and 326.

Figure 4:
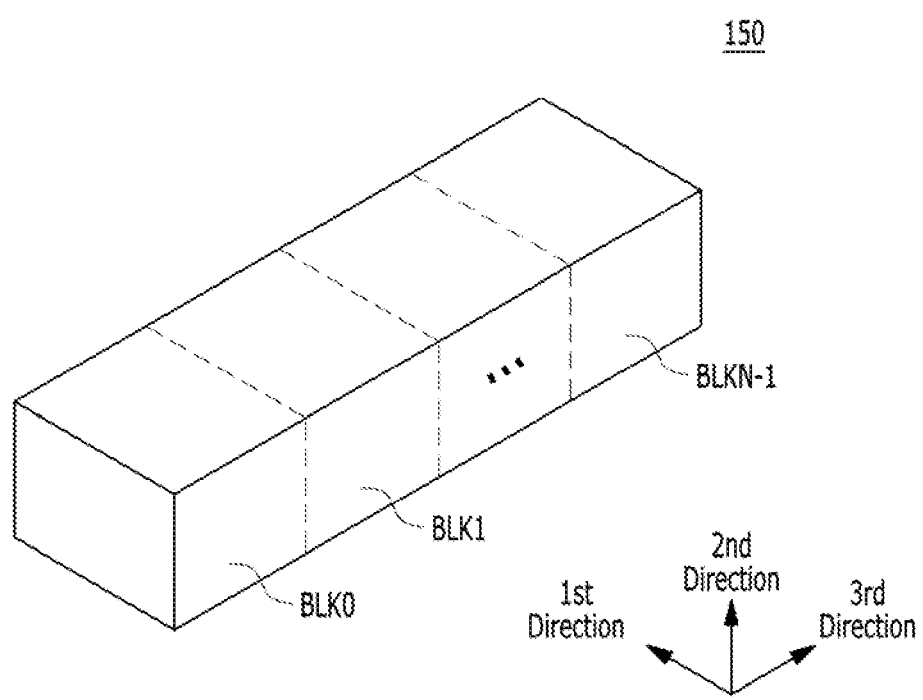
FIG. 4 is a diagram schematically illustrating a structure of the memory device in a memory system, according to an embodiment of the present invention.

Also, the memory device 150 may be realized as a 2-dimensional or 3-dimensional memory device. As shown in FIG. 4, in the case where the memory device 150 is realized as a 3-dimensional nonvolatile memory device, the memory device 150 may include a plurality of memory blocks BLK0 to BLKN−1.

FIG. 4 is a block diagram illustrating the memory blocks of the memory device shown in FIG. 2, and the memory blocks BLK0 to BLKN−1 may be realized as a 3-dimensional structure (or a vertical structure). For example, the respective memory blocks BLK0 to BLKN−1 may be realized as a 3-dimensional structure by including a structure which extends in first to third directions, for example, the x-axis direction, the y-axis direction and the z-axis direction.

The respective memory blocks BLK0 to BLKN−1 included in the memory device 150 may include a plurality of NAND strings which extend in the second direction. The plurality of NAND strings may be provided in the first direction and the third direction. Each NAND string may be coupled to a bit line, at least one string select line, at least one ground select line, a plurality of word lines, at least one dummy word line and a common source line, and may include a plurality of transistor structures.

Namely, among the plurality of memory blocks BLK0 to BLKN−1 of the memory device 150, the respective memory blocks BLK0 to BLKN−1 may be coupled to a plurality of bit lines, a plurality of string select lines, a plurality of ground select lines, a plurality of word lines, a plurality of dummy word lines and a plurality of common source lines, and accordingly, may include a plurality of NAND strings. Also, in the respective memory blocks BLK0 to BLKN−1, a plurality of NAND strings may be coupled to one bit line, and a plurality of transistors may be realized in one NAND string. A string select transistor of each NAND string may be coupled to a corresponding bit line, and a ground select transistor of each NAND string may be coupled to the common source line. Memory cells may be provided between the string select transistor and the ground select transistor of each NAND string. Namely, in the plurality of memory blocks BLK0 to BLKN−1 of the memory device 150, a plurality of memory cells may be realized in each of the memory blocks BLK0 to BLKN−1.

Hereinbelow, detailed descriptions will be made with reference to FIGS. 5 and 6, for data processing with respect to a memory device 150 in a memory system according to an embodiment of the present invention. Particularly, a command data processing operation corresponding to a command received from the host 102 with respect to the memory device 150 will be described.

Figure 5:
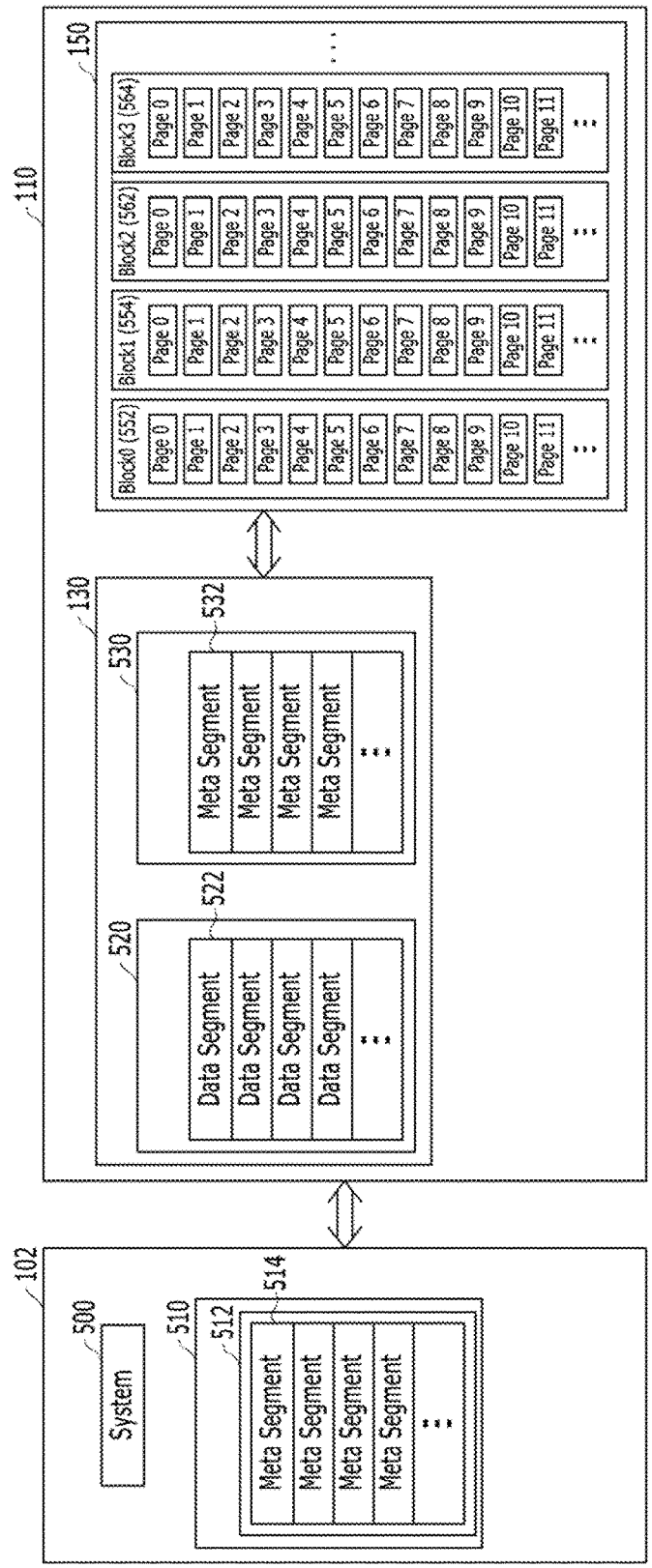
FIG. 5 is a diagram schematically illustrating an example of a data processing operation with respect to a memory device in a memory system in accordance with an embodiment of the present invention.

FIG. 5 is a diagram illustrating a data processing operation of a memory system in accordance with an embodiment of the present invention. Hereinbelow, for the sake of convenience in explanation, descriptions will be made, as an example, for data processing in the case where, in the memory system 110 shown in FIG. 1, after storing command data corresponding to a command received from the host 102, for example, write data corresponding to a write command, in the buffer/cache included in the memory 144 of the controller 130, a command operation corresponding to the command received from the host 102 is performed. For example, the data stored in the buffer/cache are written, (i.e., programmed), in the plurality of memory blocks included in the memory device 150 and then the data programmed in the memory device 150 are updated and reprogrammed in the memory device 150.

According to the present embodiment, t will be described below as an example for the sake of convenience that the controller 130 performs a data processing operation in the memory system 110, however, it is to be noted that the processor 134 included in the controller 130 may perform data processing through, for example, a flash translation layer (FTL). Moreover, in the present embodiment, the controller 130 may first store user data and metadata which correspond to a write command received from the host 102, in a buffer included in the memory 144 of the controller 130. Then the controller 130 writes and stores the data stored in the buffer, in at least one of the plurality of memory blocks included in the memory device 150, that is, performs a program operation.

The metadata may include first and second map data. The first map data may be logical to physical information (hereinafter, referred to as 'logical information' or L2P information) for the data stored in the memory blocks in correspondence to the program operation. The second map data may be physical to logical information (hereinafter, referred to as 'physical information' or P2L information). Also, the metadata may include information on the command data corresponding to the command received from the host 102, information on the command operation corresponding to the command, information on the memory blocks of the memory device 150 for which the command operation is to be performed, and information on map data corresponding to the command operation. In other words, the metadata may include all remaining information and data excluding the user data corresponding to the command received from the host 102.

In an embodiment, in the case where the controller 130 receives a command, for example, a write command, from the host 102, the controller 130 may write and store user data corresponding to the write command, in at least one first memory block of the memory device 150, and write and store metadata in at least one second memory block of the memory device 150. The at least one first memory block may be different from the at least one second memory block. In a variation of this embodiment, the at least one first memory block and the at least one second memory block may be the same. Each of the at least one first memory block and the at least one second memory block may be an open or a free memory block. An open memory block which is a memory block that is partially written. A free memory block is an empty block, i.e., a memory block that doesn't have any data (user data or metadata) written therein. The free memory block may be, for example, a memory block which has been subjected to an erase operation.

The metadata may include mapping information between a logical address and a physical address for user data stored in the memory blocks, that is, first map data including an L2P map table or L2P map list in which logical information is recorded, and mapping information between the physical address and the logical address for the memory blocks in which the user data is stored, that is, second map data including a P2L map table or P2L map list in which physical information is recorded.

In operation, according to an embodiment of the present invention, when a write command is received from the host 102, user data corresponding to the write command may be written and stored in at least one first open or free memory block, and metadata including first map data and second map data for the user data stored in the at least one first open or free memory block may be stored in at least one second open or free memory block. For example, data segments of the user data and meta segments of the metadata, may be stored in the at least one first open or free memory block and the at least one second open or free memory block of the memory device 150. The meta segments of the metadata may be, for example, map segments of the map data, i.e., L2P segments of the first map data and P2L segments of the second map. Preferably, the controller 130 may store the data segments of the user data and the meta segments of the metadata in the memory 144 included in the controller 130 before storing them in the memory device 150. Particularly, as the data segments of the user data are stored in the at least one first open or free memory block of the memory device 150, the controller 130 may generate and update the meta segments and store them in the at least one second open or free memory block of the memory device 150. For example, the controller may perform a flush operation. Hereinafter, the data processing operation in the memory system according to, an embodiment will be described in more detail with reference to FIG. 5.

Referring to FIG. 5, the controller 130 may write and store data corresponding to a command received from the host 102, for example, user data corresponding to a write command, in memory blocks 552, 554, 562 and 564 of the memory device 150. Further, in correspondence to a write operation to the memory blocks 552, 554, 562 and 564, the controller 130 may generate and update metadata for the user data and then write and store the metadata in the memory blocks 552, 554, 562 and 564 of the memory device 150.

The controller 130 may also generate and update information, e.g., first map data and second map data, indicating that the user data is stored in pages included in the memory blocks 552, 554, 562 and 564 of the memory device 150, in other words, generate and update logical segments of the first map data, that is, L2P segments, and physical segments of the second map data, that is, P2L segments, and then perform a flush operation and store the updated meta segments in the memory device 150 and a main memory 510 of the host 102. Specifically, the controller 130, writes and stores the map segments of the map data, particularly, L2P segments, in pages included in the memory blocks 552, 554, 562 and 564 of the memory device 150, and also stores the map segments of the map data, particularly, L2P segments, in a main memory 510 included in the host 102, e.g., in a Unified Memory (UM) region 512 of the main memory 510, through the flush operation. In an embodiment, the main memory 510 may include a volatile memory. For example, the main memory 510 may be a DRAM, an SDRAM, a DDR SDRAM (double data rate SDRAM), an LPDDR, SDRAM (low power DDRRAM) and a GRAM. In an embodiment, the main memory 510 may be a DRAM.

The controller 130 may cache and buffer user data corresponding to a write command received from the host 102 in a first buffer 520 included in the memory 144 of the controller 130, i.e., store data segments 522 of the user data in the first buffer 520 functioning as a data buffer/cache, and then write and store the data segments 522 stored in the first buffer 520 in pages included in the memory blocks 552, 554, 562 and 564 of the memory device 150.

As the data segments 522 of the user data which correspond to the write command received from the host 102 are written and stored in pages included in the memory blocks 552, 554, 562 and 564 of the memory device 150, the controller 130 may generate and update first map data and second map data and store them in the second buffer 530 included in the memory 144 of the controller 130, that is, store meta segments 532 including L2P segments of the first map data and P2L segments of the second map data for the user data, in the second buffer 530 functioning as a map buffer/cache. In this regard, as described above, the L2P segments of the first map data and the P2L segments of the second map data may be stored in the second buffer 530 of the memory 144 of the controller 130, or a map list for the L2P segments of the first map data and a map list for the P2L segments of the second map data may be stored in the second buffer 530.

In addition, the controller 130 may write and store the meta segments 532 stored in the second buffer 530, for example, the L2P segments of the first map data and the P2L segments of the second map data, in pages included in the memory blocks 552, 554, 562 and 564 of the memory device 150 through a flush operation. Furthermore, the controller 130 may write and store the meta segments 532 stored in the second buffer 530, for example, the L2P segments of the first map data and the P2L segments of the second map data, in the UM region 512 of the main memory 510 included in the host 102, through the flush operation.

In the present embodiment, as an example, a case is described where the data segments 522 of the user data and the meta segments 532 including the L2P segments of the first map data and the P2L, segments of the second map data are stored in different memory blocks among the memory blocks 552, 554, 562 and 564 of the memory device 150. For example, the memory blocks 552, 554, 562 and 564 may be divided into data memory blocks and map memory blocks, so that the data segments 522 are stored in the data memory blocks, and the meta segments 532 (including the L2P segments of the first map data and the P2L segments of the second map data) are stored in the map memory blocks. However, it should be understood that in a variation of this embodiment, the data segments 522 of the user data and the meta segments 532 may be stored in the same memory blocks among the memory blocks 552, 554, 562 and 564 of the memory device 150, i.e., without dividing the memory blocks into data memory blocks and map memory blocks.

The memory device 150 may include a plurality of memory dies. Each memory die may include a plurality of planes, and each plane may include a plurality of memory blocks, for example, as described above with reference to FIG. 2, an N number of blocks Block0, Block1, ... , Block N−1, each of which includes a plurality of pages, e.g., a $2^M$ number of pages ($2^M$Pages). Arbitrary memory dies among the plurality of memory dies of the memory device 150 may be coupled to the same channel.

As described above, the controller 130 according to the embodiment illustrated in FIG. 5, may store the data segments of the user data corresponding to A write command received from the host 102, in the first buffer 520 included in the memory 144 of the controller 130, and write and store, through a program operation corresponding to the write command, the data segments stored in the first buffer 520, in a memory block of the memory device 150, for example, in pages included in the memory block 0 552. In this regard, through the program operation of the controller 130 the data segments 522 stored in the first buffer 520 may be written and stored in the pages included in the memory block 0 552, for example, starting from page 0.

Furthermore, as the data segments 522 stored in the first buffer 520 are written and stored through the program operation in the pages included in the memory block 0 552, the controller 130 according to the present embodiment may generate and update metadata corresponding to storing the data segments 522 in the memory block 0 552, in other words, corresponding to the program operation. More specifically, the controller 130 may generate and update meta segments 532 of the metadata and store the meta segments 532 in the second buffer 530 included in the memory 144 of the controller 130. As stated above, the meta segments 532 may include map segments, that is, L2P segments and P2L segments, of the first map data and the second map data for the data segments 522 stored in the memory block 0 552.

The controller 130 may write and store, through a flush operation, the meta segments 532 stored in the second buffer 530 in the memory blocks of the memory device 150, for example, in pages included in the memory block 1 554 and also store the meta segments 532 in the UM region 512 included in the main memory 510 of the host 102. That is, through the flush operation of the controller 130, the meta segments 532 stored in the second buffer 530 may be stored in the pages included in the memory block 1 554, for example, from page 0, and may be also stored in the UM region 512 of the main memory 510 included in the host 102. In particular, the controller 130 may perform a first flush operation of storing the meta segments 532 stored in the second buffer 530, in the memory block 1 554 of the memory device 130, and a second flush operation of storing the meta segments 532 in the main memory 510 of the host 102, in other words, perform a double flush operation for the meta segments 532 stored in the second buffer 530. As a result, the meta segments 532 stored in the second buffer 530 may be stored in the pages included in the memory block 1 554 of the memory device 130 and in the UM region 512 included in the main memory 510 of the host 102, respectively.

In this regard, as described above, the controller 130 may store, through the first flush operation the meta segments 532 stored in the second buffer 530, in at least one of the memory blocks included in the memory device 150 in correspondence to a program size in the memory device 150. For example, the controller 130 may store, through the first flush operation, the meta segments 532 stored in the second buffer 530, in the pages included in the memory block 1 554 on a page basis, for example, in a sequence starting from the page 0, or may store the segments 532 in, pages of a plurality of memory blocks, for example, a supper memory blocks which includes a first memory block and a second memory block, on a multi-plane basis, a multi-memory die basis or a multi-channel basis.

In this regard, in correspondence to the program size in the memory device 150, the controller 130 may store, through the program operation, the data segments 522 stored in the first buffer 520, in pages included in the memory block 0 552 on a page basis, or in pages of a super memory block including at least two memory blocks on a multi-plane basis, a multi-memory die basis or a multi-channel basis. Accordingly, the meta segments 532 stored in the second buffer 530 may be stored through the first flush operation on a multi-plane basis, a multi-memory die basis or a multi-channel basis.

Each of the super memory blocks may include a plurality of memory blocks, for example, at least a first memory block and a second memory block. In the case where the first memory block is an arbitrary memory block included in a first plane of a first memory die among the plurality of memory dies, the second memory block may be another arbitrary memory block included in the first plane of the first memory die, an arbitrary memory block included in a second plane of the first memory die, or an arbitrary memory block included in a plurality of planes of a second memory die among the plurality of memory dies. That is, the second memory block may be a memory block included in the same memory die and the same plane as those of the first memory block, a memory block, included in a different plane of the same memory die as that of the first memory block, or a memory block included in a memory die different from that of the first memory block. Furthermore, each super memory block may include, as described above, two or more memory blocks. The memory blocks in each super memory block may be memory blocks included in the same plane of the same memory die, memory blocks included in different planes of the same memory die, or memory blocks included in different memory dies.

In correspondence to a size in which the meta segments 532 are stored in the memory blocks of the memory device 150 through the first flush operation, the controller 130 may store the meta segments 532 stored in the second buffer 530, in the UM region 512 of the main memory 510 included in the host 102. That is, the controller 130 may make, in the operation of storing the meta segments 532, the size in which the meta segments 532 are stored in the memory device 150 through the first flush operation and the size in which the meta segments 532 are stored in the host 102 through the second flush operation be the same as each other. For instance, as described above, as the meta segments 532 are stored through the first flush operation in the memory device 150 on a page basis, a multi-plane basis, a multi-memory die basis or a multi-channel basis, the meta segments 532 are stored through the second flush operation in the UM region 512 of the main memory 510 included in the host 102 on a page basis a multi-plane basis a multi-memory die basis or a multi-channel basis.

In the embodiment of FIG. 5, the host 102 may include a system memory 500 in which data, program information, or the like for a system of the host 102, for example, a file system or an operating system, is stored, in addition to the main memory 510. The main memory 500 may be, for example, a data memory or a buffer memory, in which data is stored when performing a command operation with the memory system 110. The main memory 510 may further contain as illustrated in FIG. 5, UM 512. As described above, the meta segments 532 after having been stored in the second buffer 530 of the controller 130 may then be stored in the UM region 512 included in the main memory 510 of the host 102, and also in at least one open or free memory block of the memory blocks of the memory device 150 through a flush operation of the controller 130. The flush operation may be a double flush operation meaning that it may include first and second flush operations wherein the first flush operation includes storing the metadata 532 after having been stored in the second buffer 530 of the memory of the controller 130 into at least one memory block of the memory device 150 and the second flush operation includes storing the metadata 532 after having been stored in the second buffer 530 of the memory of the controller 130 into the UM 512 of the host 102.

In addition, as described above, in the case where, after the data segments 522 stored in the first buffer 520 are written and stored through a program operation in the pages included in the memory block 0 552 of the memory device 150, a write command is re-received from the host 102 and a command operation, that is, a program operation, for the data segments stored in the pages of the memory block 0 552 is re-performed, the controller 130 according to the present embodiment may store data segments 522 corresponding to the write command in the first buffer 520, and write and store the data segments 522 stored in the first buffer 520, in memory blocks of the memory device 150, for example, other pages of the memory block 0 552 or pages included in the memory block 2 562. Hereinafter for the sake of convenience in explanation, detailed descriptions will be made, as an example, for the case where the data segments stored in the pages of the memory block 0 552 are stored in pages of the memory block 2 562 through a program operation, particularly, a program update operation, corresponding to a write command received from the host 102.

Accordingly, the controller 130 may first store the data segments 522 corresponding to the write command received from the host 102, in the first buffer 520. The controller 130 may then write and store, through a program update operation, the data segments 522 stored in the first buffer 520, in pages included in the memory block 2 562 of the memory device 150, for example, starting with page 0 of the memory block 2 562. In this regard, as the data segments stored in the pages of the memory block 0 552 are stored in pages of the memory block 2 562 through the program update operation data segments stored in the pages of the memory block 0 552 become invalid data segments, and the data segments stored in the pages of the memory block 2 562 become valid data segments.

As, through the program update operation, the data segments 522 which are stored in the first buffer 520 of the controller 130 are stored in pages of the memory block 2 562, in particular, the data segments stored in the pages of the memory block 0 552 are stored in the pages of the memory block 2 562, the controller 130 also may perform an operation of updating the metadata for the data segments stored in the pages of the memory block 2 562. In particular, the controller 130 may also perform an operation of updating the first map data. That is, the controller 130 may perform an operation of updating metadata which correspond to the operation in which the data segments which are stored in the pages of the memory block 0 552 are stored in pages of the memory block 2 562, and may load meta segments for the data segments corresponding to the program update operation, on the second buffer 530 of the controller 130, in particular, loads L2P segments among map segments included in the meta segments, on the second buffer 530 of the controller 130.

Then, as the meta segments 532 corresponding to the operation in which the data segments 522 stored in the first buffer 520 are stored in the pages of the memory block 0 552 are as described above stored in the UM region 512 included in the main memory 510 of the host 102 through a flush operation, in the case where the operation of updating the metadata is performed, the controller 130 may load the meta segments 514 stored in the UM region 512 of the main memory 510 of the host 102, on the second buffer 530 of the controller 130. That is, in the case where the operation of updating metadata for data segments corresponding to the program update operation is performed, the controller 130 may load the meta segments 514 of the metadata from the UM region 512 of the main memory 510 included in the host 102, on the second buffer 530 of the memory 144 included in the controller 130.

The controller 130 may update the meta segments 532 loaded from the UM region 512 of the main memory 510 included in the host 102, on the second buffer 530 of the memory 144 included in the controller 130, and then store the updated meta segments 532, through a double flush operation, in memory blocks of the memory device 150, for example, in other pages of the memory block 1 554 or pages of the memory block 3 564, and in the UM region 512 of the main memory 510 included in the host 102.

Furthermore, after as described above the program update operation has been performed, in the case where power off in the memory system 110 and the host 102 occurs before the operation of updating metadata corresponding to the program update operation, in particular, the operation of updating first map data, is performed, particularly, in the case where sudden power off occurs during an operation of loading meta segments for data segments corresponding to the program update operation on the second buffer 530 of the controller 130, the controller 130 may load the meta segments stored in the memory blocks of the memory device 150, on the second buffer 530 of the controller 130 when the memory system 110 and the host 102 are powered on.

In other words, when the memory system 110 and the host 102 that have been powered off during an operation of updating metadata are powered on again, the controller 130 may perform the operation of updating metadata, corresponding to the operation in which the data segments stored in the pages of the memory block 0 552 are stored in pages of the memory block 2 562, that corresponding to the program update operation, and load meta segments for data segments corresponding to program update operation, on the second buffer 530 of the controller 130 from the memory block 1 of the memory device 150, in particular, loads L2P segments among map segments included in the meta segments, on the second buffer 530 of the controller 130.

In the case where, as described above, the controller 130 performs an operation of updating metadata as the meta segments 532 corresponding to the operation in which the data segments 522 stored in the first buffer 520 are stored in the pages of the memory block 0 552 are stored in pages of the memory block 1 554 through a flush operation, the controller 130 may load the meta segments stored in the pages of the memory block 1 554, on the second buffer 530 of the controller 130. That is, in the case where power off occurs during the operation of updating metadata for data segments corresponding to the program update operation is performed, because the meta segments 514 are not present in the UM region 512 of the main memory 510 included in the host 102, the controller 130 may load the meta segments of the metadata from the memory blocks of the memory device 150, for example, from the pages of the memory the controller 130.

The controller 130 may update the meta segments 532 loaded from the pages of the memory block 1 554 included in the memory device 150, on the second buffer 530 of the memory 144 included in the controller 130, and then store the updated meta segments 532, through a double flush operation, in memory blocks of the memory device 150 for example, in other pages of the memory block 1 554 or pages of the memory block 3 564, and in the UM region 512 of the main memory 510 included in the host 102.

In the memory system according to the present embodiment, user data corresponding to a command received from the host 102 may be stored, through a command operation, for example, a program operation, in memory blocks included in the memory device 150. Furthermore, after metadata corresponding to the command operation is generated and updated, the metadata may be stored through a double flush operation in memory blocks of the memory device 150 and the main memory 510 of the host 102, in particular, in the UM region 512. In the case where metadata is loaded on the controller 130 so as to perform an update operation for the metadata, metadata stored in the main memory 510 of the host 102 may be loaded on the controller 130. In this case, since metadata is loaded on the controller 130 from the main memory 510 of the host 102, the metadata may be rapidly loaded on the controller 130, and accordingly the update operation for the metadata can be rapidly performed. Hereinafter, the operation of processing data in the memory system in accordance with the present embodiment will be described in more detail with reference to FIG. 6.

Figure 6:
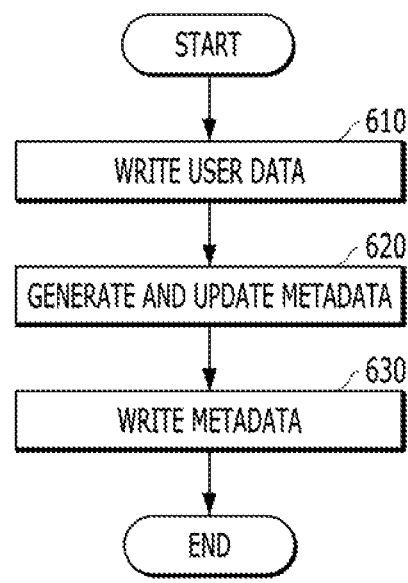
FIG. 6 is a flowchart of an operating process for processing data in a memory system in accordance with an embodiment of the present invention.

FIG. 6 is a flowchart of an operating process of processing data in a memory system in accordance with an embodiment of the present invention.

Referring to FIG. 6, in the memory system, at step 610 in the case where a write command is received from the host 102 the memory system may write the user data which correspond to the received write command in the memory device 150 of the memory system. More specifically, as described earlier, the write operation (also referred to as a program operation) may include first storing the data segments of the user data for the write operation in the memory 144 of the controller 130 of the memory system, particularly in the first buffer 510 included in the memory 144, and, then, the data segments stored in the first buffer 510 may be written and stored in at least one first open or free memory block of the memory device 150.

The operation may further include, at step 620, generating and updating the metadata for the user data, in particular, map data in correspondence to storing the user data in the at least first open or free memory block of the memory device 150.

The operation further includes writing the metadata (updated metadata) at step 630. More specifically the writing the metadata step 630 may include first storing stored in the memory 144 of the controller 130. In particular, the meta segments of metadata including the generated and updated map data may be stored in the second buffer 520 included in the memory 144. Then, meta segments stored in the second buffer 520 may be stored in at least one second memory block of the memory device 150 and also in the main memory of the host 102, particularly, in the UM region of the main memory, through a flush operation. The flush operation may be a double flush operation. The at least one first and second memory blacks may be different. The at least one first and second memory blocks may be the same.

Detailed descriptions of the aforementioned steps of the operation have been provided above, with reference to FIG. 5, including for an operation of storing, in the case where a command operation corresponding to a command received from the host is performed, data segments of user data and meta segments of metadata for the command operation, in particular, an operation of storing the meta segments of the metadata in the memory blocks of the memory device and the main memory of the host through a double flush operation, and an operation of loading the meta segments of the metadata for a metadata updating operation on the controller, in particular, an operation of loading the meta segments stored in the main memory of the host or loading the meta segments stored in the memory blocks of the memory device as a result of power off; therefore, further detailed description thereof will be omitted.

Hereinbelow, detailed descriptions will be made with reference to FIGS. 7 to 12, of various electronic devices employing a memory system, according to various embodiments of the present invention.

Figure 7:
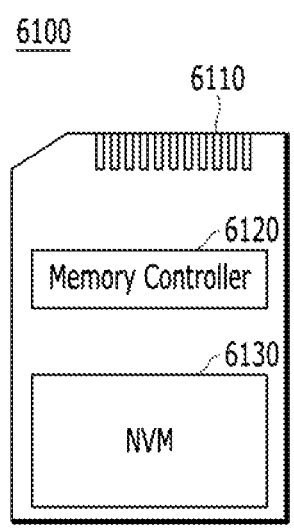
FIGS. 7 to 12 are diagrams schematically illustrating memory systems, according to embodiments of the present invention.

FIG. 7 is a diagram illustrating a data processing system including the memory system according to the embodiment. FIG. 7 is a diagram illustrating a memory card system, according to an embodiment of the present invention.

Referring to FIG. 7, a memory card system 6100 includes a memory controller 6120, a memory device 6130, and a connector 6110.

In detail, the memory controller 6120 may be connected with the memory device 6130 and may access the memory device 6130. In some embodiments the memory device 6130 may be implemented with a nonvolatile memory (NVM). For example, the memory controller 6120 may control read, write, erase and background operations for the memory device 6130. The memory controller 6120 may provide an interface between the memory device 6130 and a host (not shown), and may drive a firmware for controlling the memory device 6130. For example, the memory controller 6120 may correspond to the controller 130 in the memory system 110 described above with reference to FIG. 1, and the memory device 6130 may correspond to the memory device 150 in the memory system 110 described above with reference to FIG. 1.

Therefore, the memory controller 6120 may include components such as a random access memory (RAM), a processing unit, a host interface, a memory interface and an error correction unit as shown in FIG. 1.

The memory controller 6120 may communicate with an external device (for example, the host 102 described above with reference to FIG. 1), through the connector 6110. For example, as described above with reference to FIG. 1, the memory controller 6120 may be configured to communicate with the external device through at least one of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (ESDI), Integrated Drive Electronics (IDE), Firewire, universal flash storage (UFS) wireless-fidelity (WI-FI) and Bluetooth. Accordingly, the memory system and the data processing system according to the embodiment may be applied to wired/wireless electronic appliances. For example, a mobile electronic appliance.

The memory device 6130 may be implemented with a nonvolatile memory. For example, the memory device 6130 may be implemented with various nonvolatile memory devices such as an electrically erasable and programmable ROM (EPROM), a NAND flash memory, a NOR flash memory, a phase-change RAM (PRAM), a resistive RAM (ReRAM), a ferroelectric RAM (FRAM) and a spin torque transfer magnetic RAM STT-MRAM).

The memory controller 6120 and the memory device 6130 may be integrated into a single semiconductor device. For example, the memory controller 6120 and the memory device 6130 may construct a solid state driver (SSD) by being integrated into a single semiconductor device. The memory controller 6120 and the memory device 6130 may construct a memory card such as a PC card (PCMCIA: Personal Computer Memory Card International Association), a compact flash card (CF), a smart media card (SM and SMC), a memory stick, a multimedia card (MMC, RS-MMC, MMCmicro and eMMC), an SD card (e.g., SD, miniSD, microSD and SDHC) and a universal flash storage (UFS).

Figure 8:
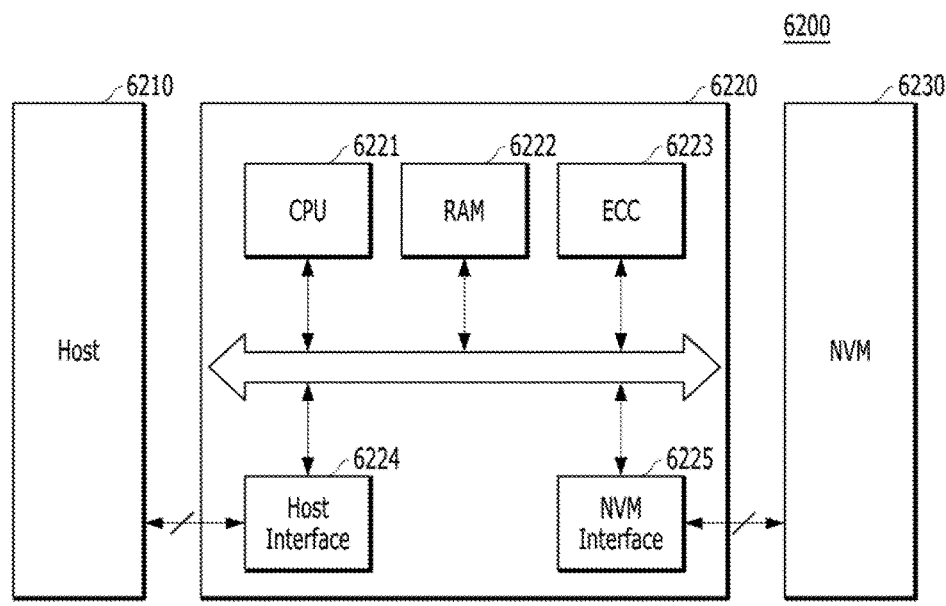

FIG. 8 is a block diagram illustrating a data processing system according to an embodiment of the present invention.

Referring to FIG. 8 a data processing system 6200 includes a memory device 6230 which may be implemented with at least one nonvolatile memory (NVM) and a memory controller 6220 for controlling the memory device 6230. The data processing system 6200 may be a storage medium such as a memory card (e.g., CF, SD and microSD), as described above with reference to FIG. 1. The memory device 6230 may correspond to the memory device 150 in the memory system 110 described above with reference to FIG. 1, and the memory controller 6220 may correspond to the controller 130 in the memory system 110 described above with reference to FIG. 1.

The memory controller 6220 may control the operations, including the read, write and erase operations for the memory device 6230 in response to requests received from a host 6210. The memory controller 6220 may include a central processing unit (CPU) 6221, a random access memory (RAM) as a buffer memory 6222, an error correction code (ECC) circuit 6223, a host interface 6224, and an NVM interface as a memory interface 6225, all coupled via an internal bus.

The CPU 6221 may control the operations for the memory device 6230 such as read, write, file system management, bad page management, and so forth. The RAM 6222 may operate according to control of the CPU 6221, and may be used as a work memory, a buffer memory, a cache memory, or the like. In the case where the RAM 6222 is used as a work memory, data processed by the CPU 6221 is temporarily stored in the RAM 6222. In the case where the RAM 6222 is used as a buffer memory, the RAM 6222 is used to buffer data to be transmitted from the host 6210 to the memory device 6230 or from the memory device 6230 to the host 6210. In the case where the RAM 6222 is used as a cache memory the RAM 6222 may be used to enable the memory device 6230 with a low speed to operate at a high speed.

The ECC circuit 6223 corresponds to the ECC unit 138 of the controller 130 described above with reference to FIG. 1. As described above with reference to FIG. 1, the ECC circuit 6223 may generate an error correction code (ECC) for correcting a fail bit or an error bit in the data received from the memory device 6230. The ECC circuit 6223 may perform error correction encoding for data to be provided to the memory device 6230, and may generate data added with parity bits. The parity bits may be stored in the memory device 6230. The ECC circuit 6223 may perform error correction decoding for data outputted from the memory device 6230. At this time, the ECC circuit 6223 may correct errors by using the parity bits. For example, as described above with reference to FIG. 1, the ECC circuit 6223 may correct errors by using various coded modulations such as of a low density parity check (LDPC) code, a Bose-Chaudhuri-Hocquenghem (BCH) code, a turbo code, a Reed-Solomon (RS) code, a convolution code a recursive systematic code (RSC), a trellis-coded modulation (TCM) and a Block coded modulation (BCM).

The memory controller 6220 transmits and receives data to and from the host 6210 through the host interface 6224, and transmits and receives data to and from the memory device 6230 through the NVM interface 6225. The host interface 6224 may be connected with the host 6210 through at least one of various interface protocols such as a parallel advanced technology attachment (PATA) bus, a serial advanced technology attachment (SATA) bus, a small computer system interface (SCSI), a universal serial bus (USB), a peripheral component interconnection express (PCIe) or a NAND interface. Further, as a wireless communication function or a mobile communication protocol such as wireless fidelity (WI-FI) or long term evolution (LTE) is realized, the memory controller 6220 may transmit and receive data by being connected with an external device such as the host 6210 or another external device other than the host 6210. Specifically, as the memory controller 6220 is configured to communicate with an external device through at least one among various communication protocols, the memory system and the data processing system according to the embodiment may be applied to wired/wireless electronic appliances. For example, a mobile electronic appliance.

Figure 9:
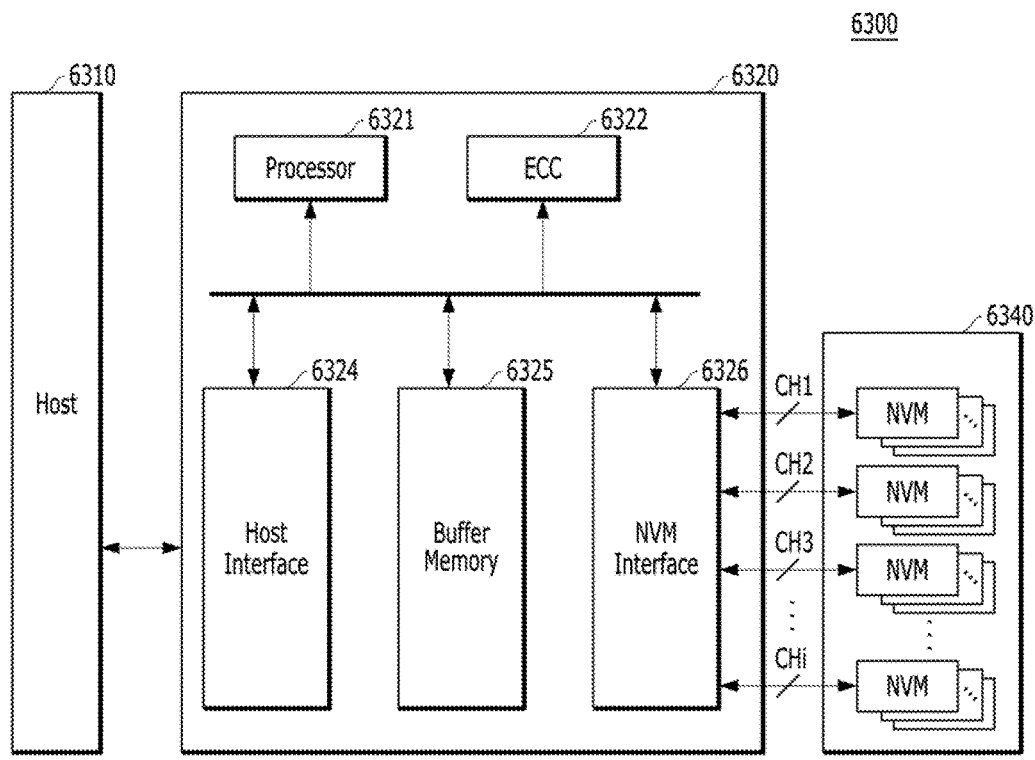

FIG. 9 is a block diagram illustrating a solid state drive (SSD), according to an embodiment of the present invention.

Referring to FIG. 9, an SSD 6300 may include a memory device 6340 which may include a plurality of nonvolatile memories NVM, and a controller 6320. The controller 6320 may correspond to the controller 130 in the memory system 110 described above with reference to FIG. 1, and the memory device 6340 may correspond to the memory device 150 in the memory system 110 described above with reference to FIG. 1.

In detail, the controller 6320 may be connected with the memory device 6340 through a plurality of channels CH1, CH2, CH3, . . . and CHi. The controller 6320 may include a processor 6321, a buffer memory 6325, an error correction code (ECC) circuit 6322, a host interface 6324 and a nonvolatile memory (NVM) interface as a memory interface 6326 coupled via an internal bus.

The buffer memory 6325 temporarily stores data received from a host 6310 or data received from a plurality of nonvolatile memories NVMs included in the memory device 6340, or temporarily stores metadata of the plurality of nonvolatile memories NVMs. For example, the metadata may include map data including mapping tables. The buffer memory 6325 may be implemented with a volatile memory such as, but not limited to, a dynamic random access memory (DRAM) a synchronous dynamic random access memory (SDRAM), a double data rate (DDR) SDRAM, a low power double data rate (LPDDR) SDRAM and a graphic random access memory (GRAM) or a nonvolatile memory such as, but not limited to, a ferroelectric random access memory (FRAM), a resistive random access memory (ReRAM), a spin-transfer torque magnetic random access memory (STT-MRAM) and a phase change random access memory (PRAM). While it is illustrated in FIG. 9, for the sake of convenience in explanation, that the buffer memory 6325 is disposed inside the controller 6320, it is to be noted that the buffer memory 6325 may be disposed outside the controller 6320.

The ECC circuit 6322 calculates error correction code values of data to be programmed in the memory device 6340 in a program operation, performs an error correction operation for data read from the memory device 6340, based on the error correction code values, in a read operation and performs an error correction operation for data recovered from the memory device 6340 in a recovery operation for failed data.

The host interface 6324 provides an interface function with respect to an external device such as the host 6310. The nonvolatile memory interface 6326 provides an interface function with respect to the memory device 6340 which is connected through the plurality of channels CH1, CH2, CH3, . . . and CHi.

As a plurality of SSDs 6300 to each of which the memory system 110 described above with reference to FIG. 1 is applied are used, a data processing system such as a redundant array of independent disks (RAID) system may be implemented. In the RAID system the plurality of SSDs 6300 and an RAID controller for controlling the plurality of SSDs 6300 may be included. In the case of performing a program, operation by receiving a write command from the host 6310, the RAID controller may select at least one memory system (For example, at least one SSD 6300) in response to the RAID level information of the write command received from the host 6310, among a plurality of RAID levels (for example, the plurality of SSDs 6300) and may output data corresponding to the write command, to the selected SSD 6300. In the case of performing a read operation by receiving a read command from the host 6310, the RAID controller may select at least one memory system (For example, at least one SSD 6300) in response to the RAID level information of the write command received from the host 6310, among the plurality of RAID levels (for example, the plurality of SSDs 6300), and may provide data outputted from the selected SSD 6300, to the host 6310.

Figure 10:
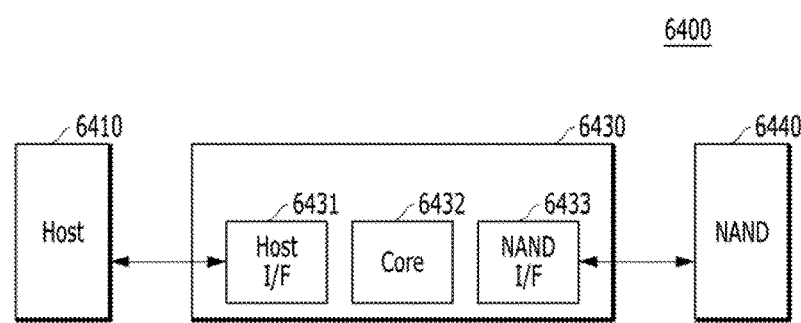

FIG. 10 is a diagram illustrating another example of a data processing system including the memory system according to an embodiment of the present invention. FIG. 10 is a block diagram schematically illustrating an embedded multimedia card (eMMC), according to an embodiment of the present invention.

Referring to FIG. 10, an eMMC 6400 includes a memory device 6440 which is implemented with at least one NAND flash memory, and a controller 6430. The controller 6430 may correspond to the controller 130 in the memory system 110 described above with reference to FIG. 1 and the memory device 6440 may correspond to the memory device 150 in the memory system 110 described above with reference to FIG. 1.

In detail, the controller 6430 may be connected with the memory device 6440 through a plurality of channels. The controller 6430 may include a core 6432, a host interface 6431, and a memory interface such as a NAND interface 6433.

The core 6432 may control the operations of the eMMC 6400, The host interface 6431 may provide an interface function between the controller 6430 and a host 6410. The NAND interface 6433 may provide an interface function between the memory device 6440 and the controller 6430. For example, the host interface 6431 may be a para lei interface such as an MMC interface as described above with reference to FIG. 1, or a serial interface such as an ultra-high speed class 1 (UHS-I)/UHS class 2 (UHS-II) and a universal flash storage (UFS) interface.

Figure 11:
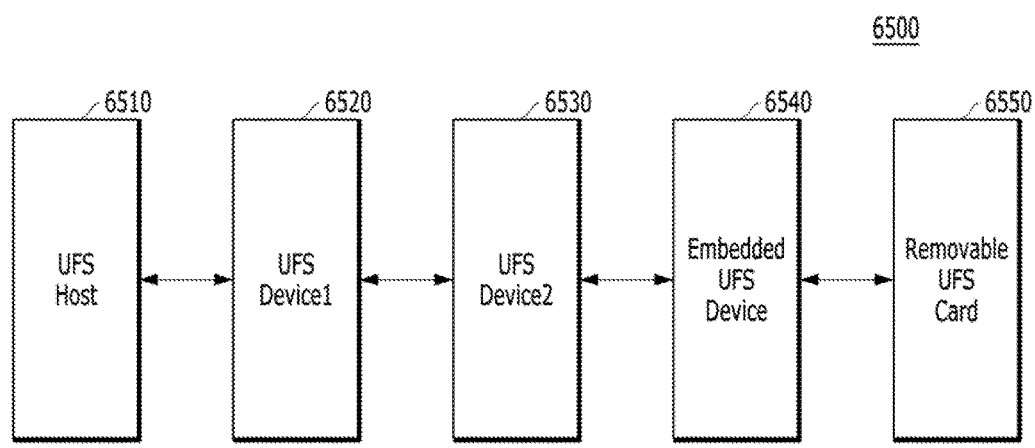

FIG. 11 is a diagram illustrating another example of a data processing system including a memory system according to an embodiment of the present invention. FIG. 11 is a block diagram illustrating a universal flash storage (UFS), according to an embodiment of the present invention.

Referring to FIG. 11, a UFS system 6500 may include a UFS host 6510, a plurality of UFS devices 6520 and 6530, an embedded UFS device 6540, and a removable UFS card 6550. The UFS host 6510 may be an application processor of wired/wireless electronic appliances, for example, a mobile electronic appliance.

The UFS host 6510, the UFS devices 6520 and 6530, the embedded UFS device 6540 and the removable UFS card 6550 may respectively communicate with external devices such as wired/wireless electronic appliances (for example, a mobile electronic appliance), through a UFS protocol. The UFS devices 6520 and 6530, the embedded UFS device 6540 and the removable UFS card 6550 may be implemented with the memory system 110 described above with reference to FIG. 1, for example, as the memory card system 6100 described above with reference to FIG. 7. The embedded UFS device 6540 and the removable UFS card 6550 may communicate through another protocol other than the UFS protocol. For example, the embedded UFS device 6540 and the removable UFS card 6550 may communicate through various card protocols such as, but not limited to, USB flash drives (UFDs), multimedia card (MMC), secure digital (SD), mini SD and Micro SD.

Figure 12:
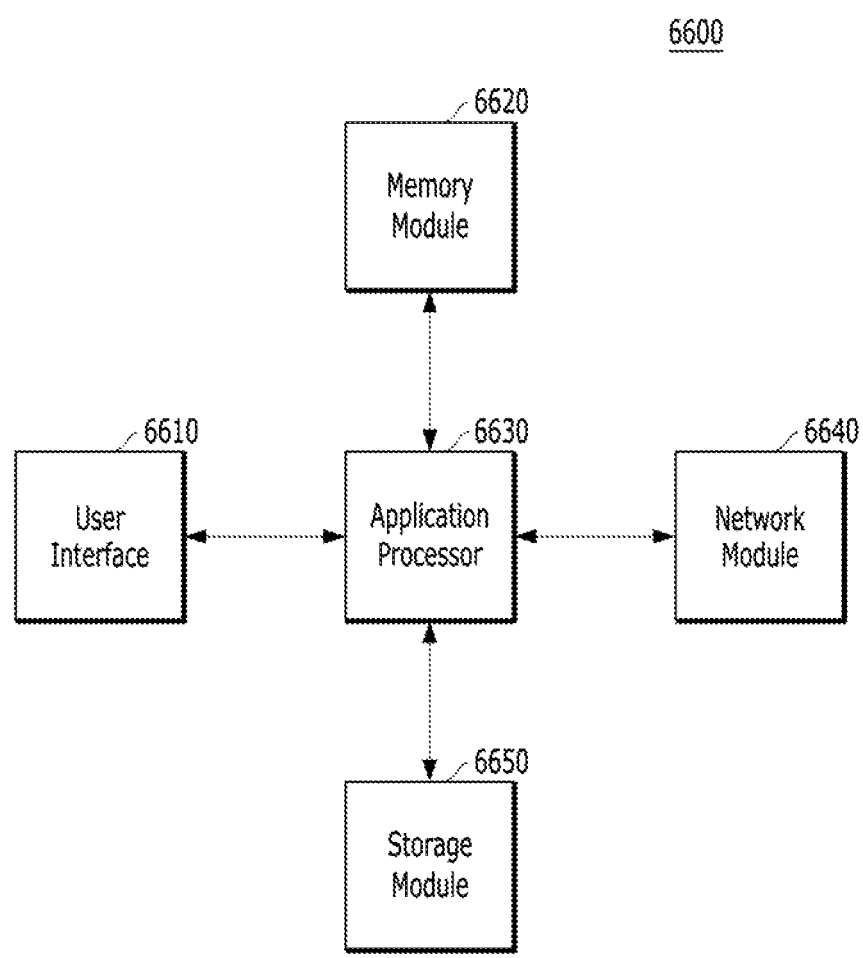

FIG. 12 is a diagram illustrating an example of a data processing system including the memory system according to an embodiment of the present invention. FIG. 12 is a block diagram schematically illustrating a user system including a memory system, according to an embodiment of the present invention.

Referring to FIG. 12, a user system 6600 may include an application processor 6630, a memory module 6620, a network module 6640, a storage module 6650, and a user interface 6610.

The application processor 6630 may drive components included in the user system 6600 and an operating system (OS). For example, the application processor 6630 may include controllers for controlling the components included in the user system 6600, interfaces, graphics engines, and so on. The application processor 6630 may be provided by a system-on-chip (SoC).

The memory module 6620 may operate as a main memory, a working memory, a buffer memory or a cache memory of the user system 6600. The memory module 6620 may include a volatile random access memory such as a dynamic random access memory (DRAM), a synchronous dynamic random access memory (SDRAM), a double data rate (DDR) SDRAM, a DDR2 SDRAM, a DDR3 SDRAM, a low power double data rate (LPDDR) SDRAM, an LPDDR2 SDRAM and an LPDDR3 SDRAM or a nonvolatile random access memory such as a phase change random access memory (PRAM), a resistive random access memory (ReRAM), a magnetic random access memory (MRAM) and a ferroelectric random access memory (FRAM). For example, the application processor 6630 and the memory module 6620 may be mounted by being packaged on the basis of a package-on-package (POP).

The network module 6640 may communicate with external devices. For example, the network module 6640 may support not only wired communications but also various wireless communications such as code division multiple access (CDMA) global system for mobile communication (GSM), wideband CDMA (WCDMA), CDMA-2000, time division multiple access (TDMA), long term evolution (LTE), worldwide interoperability for microwave access (WiMAX), wireless local area network (WLAN) ultra-wideband (UWB), Bluetooth, wireless display (WI-DI), and so on, and may thereby communicate with wired/wireless electronic appliances. For example, a mobile electronic appliance. According to this fact, the memory system and the data processing system according to the embodiment may be applied to wired/wireless electronic appliances. The network module 6640 may be included in the application processor 6630.

The storage module 6650 may store data such as data received from the application processor 6530, and transmit data stored therein, to the application processor 6530. The storage module 6650 may be realized by a nonvolatile semiconductor memory device such as a phase-change RAM (PRAM), a magnetic RAM (MRAM), a resistive RAM (ReRAM), a NAND flash memory, a NOR flash memory and a 3-dimensional NAND flash memory. The storage module 6650 may be provided as a removable storage medium such as a memory card of the user system 6600 and an external drive. For example, the storage module 6650 may correspond to the memory system 110 described above with reference to FIG. 1, and may be implemented with the SSD, eMMC and UFS described above with reference to FIGS. 9 to 11.

The user interface 6610 may include interfaces for inputting data or commands to the application processor 6630 or for outputting data to an external device. For example, the user interface 6610 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, a light emitting diode (LED), a speaker and a motor.

In the case where the memory system 110 described above with reference to FIG. 1 is applied to the mobile electronic appliance of the user system 6600 according to an, embodiment, the application processor 6630 may control the operations of the mobile electronic appliance, and the network module 6640 as a communication module may control wired/wireless communication with an external device, as described above. The user interface 6610 as the display/touch module of the mobile electronic appliance displays data processed by the application processor 6630 or supports input of data from a touch panel.

The memory system and the operating method thereof according to various embodiments of the present invention are less complex, exhibit less performance deterioration, and increase the use efficiency of the memory device, to thereby more quickly and stably process data with respect to the memory device.

Although various embodiments have been described for illustrative purposes, it will be apparent to those skilled in the art that various changes and modifications may be made without departing from the spirit and scope of the invention as defined in the following claims.

What is claimed is:

1. A memory system comprising:
   a memory device comprising a plurality of pages, which include a plurality of memory cells coupled to a plurality of word lines, and in which data is stored, a plurality of memory blocks in which the pages are included, a plurality of planes including the memory blocks, and a plurality of memory dies in which the planes are included; and
   a controller including a first memory, the controller configured to perform a command operation to store data segments of user data for the command operation in the memory blocks, and store meta segments of metadata for the command operation in the memory blocks and a second memory included in the host,
   wherein the controller stores the meta segments of metadata for the command operation in the memory blocks and in a Unified Memory (UM) region of the second memory through a double flush operation.

2. The memory system of claim 1, the controller loads meta segments stored in the UM region of the second memory, on the first memory and performs an update operation for the metadata.

3. The memory system of claim 2, wherein, in the case where power off occurs in the host and the memory system after the double flush operation has been performed, the controller loads, when the memory system is changed to a power-on state, meta segments from the memory blocks on the first memory and performs an update operation for the metadata.

4. The memory system of claim 1, wherein the controller stores, through a program operation of the command operation, the data segments in pages that are included in a first memory block and a second memory block among the memory blocks.

5. The memory system of claim 4, wherein the controller stores, in correspondence to a size of the program operation, the meta segments in the pages of the first memory block and the second memory block and in the UM region of the second memory, respectively.

6. The memory system of claim 5, wherein the controller stores, in correspondence to the size of the program operation, each of the meta segments on a page basis, a multi-plane basis, a multi-memory die basis, or a multi-channel basis.

7. The memory system of claim 5, wherein the first memory block is an arbitrary memory block among memory blocks included in a first plane of a first memory die among the memory dies.

8. The memory system of claim 7, wherein the second memory block is at least one of another arbitrary memory block different from the arbitrary memory block among the memory blocks included in the first plane of the first memory die among the memory dies, and an arbitrary memory block among memory blocks included in a second plane of the first memory die.

9. The memory system of claim 7, wherein the second memory block is an arbitrary memory block among memory blocks included in a plurality of planes of a second memory die among the memory dies.

10. An operating method of a memory system comprising:
    receiving a command from a host, for a plurality of pages, which are included in each of a plurality of memory blocks of a memory device, and which include a plurality of memory cells coupled to a plurality of word lines;
    performing a command operation corresponding to the command, between a controller of the memory device and the memory blocks included in a plurality of planes in a plurality of memory dies included in the memory device; and
    storing data segments of user data for the command operation in the memory blocks, and storing meta segments of metadata for the command operation in the memory blocks and a second memory included in the host,
    wherein the storing meta segments comprises storing the meta segments for the command operation in the memory blocks and in an Unified Memory (UM) region of the second memory through a double flush operation.

11. The operating method of claim 10, further comprising:
    loading the meta segments stored in the UM region of the second memory, on a first memory included in the controller of the memory device, and performing an update operation for the metadata.

12. The operating method of claim 11, further comprising:
    loading, when the memory system is changed to a power-on state after power off has occurred in the host and the memory system after the double flush operation has been performed, meta segments from the memory blocks on the first memory, and performing an update operation for the metadata.

13. The operating method of claim 10, wherein the storing data segments comprises storing, through a program operation of the command operation, the data segments in pages that are included in a first memory block and a second memory block among the memory blocks.

14. The operating method of claim 13, wherein the storing meta segments comprises storing, in correspondence to a size of the program operation, the meta segments in the pages of the first memory block and the second memory block and in the UM region of the second memory, respectively.

15. The operating method of claim 14, wherein the storing meta segments comprises storing, in correspondence to the size of the program operation, each of the meta segments on a page basis, a multi-plane basis, a multi-memory die basis, or a multi-channel basis.

16. The operating method of claim 14, wherein the first memory block is an arbitrary memory block among memory blocks included in a first plane of a first memory die among the memory dies.

17. The operating method of claim 16, wherein the second memory block is at least one of another arbitrary memory block different from the arbitrary memory block among the memory blocks included in the first plane of the first memory die among the memory dies, and an arbitrary memory block among memory blocks included in a second plane of the first memory die.

18. The operating method of claim 16, wherein the second memory block is an arbitrary memory block among memory blocks included in a plurality of planes of a second memory die among the memory dies.

* * * * *